United States Patent
Tzikas et al.

(12) 
(10) Patent No.: US 6,906,195 B2
(45) Date of Patent: Jun. 14, 2005

(54) PYRIDONE DYES, A PROCESS FOR THE PREPARATION AND THEIR USE IN THE PRODUCTION OF COLORED PLASTICS OR POLYMERIC COLOR PARTICLES

(75) Inventors: Athanassios Tzikas, Pratteln (CH); Urs Lauk, Zürich (CH); Romeo Dreier, Fehren (CH); Antoine Clément, Basel (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/476,954
(22) PCT Filed: Apr. 30, 2002
(86) PCT No.: PCT/EP02/04745

§ 371 (c)(1),
(2), (4) Date: Nov. 5, 2003

(87) PCT Pub. No.: WO02/090442
PCT Pub. Date: Nov. 14, 2002

(65) Prior Publication Data
US 2004/0143107 A1 Jul. 22, 2004

(30) Foreign Application Priority Data

May 7, 2001 (CH) .............................................. 823/01
Jul. 25, 2001 (CH) .............................................. 1387/01

(51) Int. Cl.$^7$ .......................................... C07D 211/15
(52) U.S. Cl. ..................................... 546/261; 546/264
(58) Field of Search .................................. 546/261, 264

(56) References Cited

U.S. PATENT DOCUMENTS

| 4,079,052 A |   | 3/1978  | Muller ........................ 260/156 |
|-------------|---|---------|-------------------------------------|
| 4,487,855 A | * | 12/1984 | Shih et al. .................... 523/201 |
| 5,153,068 A | * | 10/1992 | Kohara et al. ............... 428/405 |
| 5,421,872 A |   | 6/1995  | Haus et al. .................... 106/22 |
| 5,599,354 A |   | 2/1997  | Adam et al. ..................... 8/641 |

FOREIGN PATENT DOCUMENTS

| EP | 0 648 816 | * 10/1994 |
| EP | 0638620   | 2/1995    |

* cited by examiner

*Primary Examiner*—D. Margaret Seaman
(74) *Attorney, Agent, or Firm*—Kevin T. Mansfield

(57) ABSTRACT

The present invention relates to pyridone dyes of formula (1), wherein R is a radical —(CR'H)$_n$—W, R' is hydrogen, C$_1$–C$_2$alkyl or phenyl, Y is cyano, —CONH$_2$ or —CH$_2$SO$_3$H, W is hydrogen, a radical —NR$_1$R$_2$ or a radical —OR$_3$, R$_1$ and R$_2$ are each independently of the other hydrogen, unsubstituted or hydroxy- or phenyl-substituted C$_1$–C$_6$-alkyl, it being possible for the alkyl chain from C$_3$ upwards to be interrupted by one or more oxygen atoms, or a radical of formula (3), (4) or (5), or R$_1$ and R$_2$ together with the nitrogen atom in —NR$_1$R$_2$ form a heterocyclic ring, R$_3$ is hydrogen, unsubstituted or hydroxy-substituted C$_1$–C$_6$alkyl, phenyl or a radical of formula (6), R$_4$ is alkyl or aryl, R$_5$ and R$_6$ are each independently of the other alkyl, aryl or heteroaryl, n is an integer from 2 to 6, and m is an integer from 1 to 6, a process for the preparation thereof and their use in the production of coloured plastics or polymeric colour particles

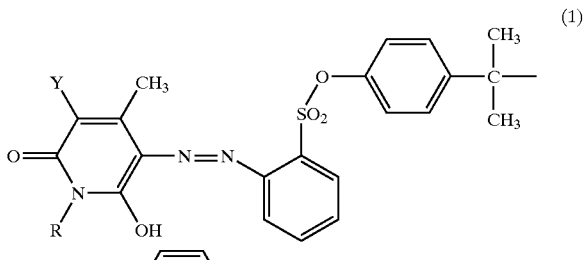

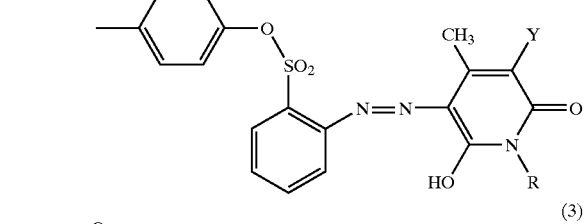

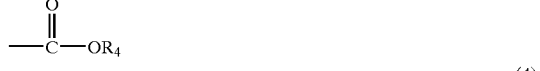

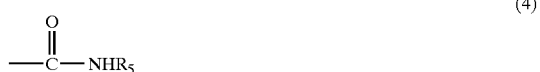

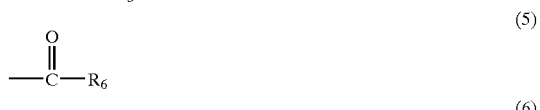

5 Claims, No Drawings

PYRIDONE DYES, A PROCESS FOR THE PREPARATION AND THEIR USE IN THE PRODUCTION OF COLORED PLASTICS OR POLYMERIC COLOR PARTICLES

The present invention relates to pyridone dyes, to their preparation and to their use in the production of coloured plastics or polymeric colour particles.

Pyridone dyes and their use in dyeing semi-synthetic or synthetic hydrophobic fibre materials are known. When the known pyridone dyes are used for mass-colouring synthetic materials (plastics), it has been shown, however, that those pyridone dyes do not always fully satisfy the highest demands, especially in respect of heat resistance, migration characteristics and/or tinctorial strength. There is therefore a need for new pyridone dyes that yield thermostable, tinctorially strong mass-colorations and exhibit good allround fastness properties.

It has now been found, surprisingly, that the pyridone dyes according to the invention meet the criteria given above to a considerable degree.

The present invention accordingly relates to pyridone dyes of formula

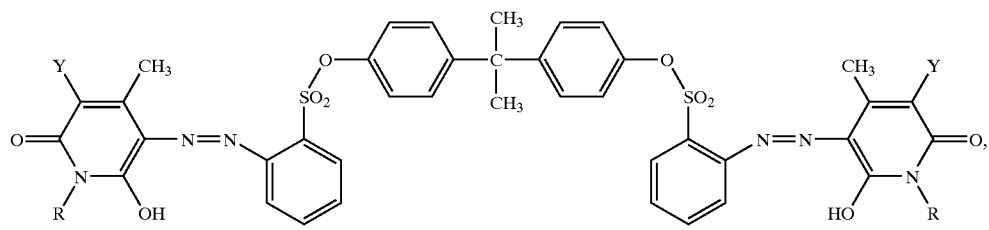

wherein
R is a radical —(CR'H)$_n$—W,
R' is hydrogen, $C_1$–$C_2$alkyl or phenyl,
Y is cyano, —CONH$_2$ or —CH$_2$SO$_3$H,
W is hydrogen, a radical —NR$_1$R$_2$ or a radical —OR$_3$,
R$_1$ and R$_2$ are each independently of the other hydrogen, unsubstituted or hydroxy- or phenyl-substituted $C_1$–$C_6$alkyl, it being possible for the alkyl chain from $C_3$ upwards to be interrupted by one or more oxygen atoms, or a radical of formula

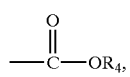  (3)

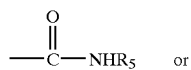 or  (4)

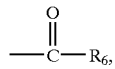  (5)

or R$_1$ and R$_2$ together with the nitrogen atom in —NR$_1$R$_2$ form a heterocyclic ring,
R$_3$ is hydrogen, unsubstituted or hydroxy-substituted $C_1$–$C_6$alkyl, phenyl or a radical of formula

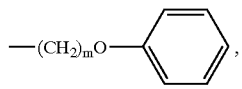  (6)

R$_4$ is alkyl or aryl,
R$_5$ and R$_6$ are each independently of the other alkyl, aryl or heteroaryl,
n is an integer from 2 to 6, and
m is an integer from 1 to 6.

$C_1$–$C_6$Alkyl as R$_1$, R$_2$ and R$_3$ is, for example, methyl, ethyl, propyl, isopropyl, n-butyl, isobutyl, sec-butyl, tert-butyl, amyl, tert-amyl (1,1-dimethylpropyl), 1,1,3,3-tetramethylbutyl, hexyl, 1-methylpentyl, neopentyl, cyclopentyl, cyclohexyl, and the associated isomers.

R' is preferably hydrogen.
R$_1$ is preferably hydrogen.
R$_2$ is preferably methyl, ethyl or the radical of formula —CO—R$_6$ (5).
R$_3$ is preferably hydrogen or the radical of formula

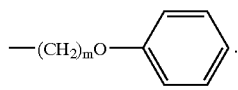  (6)

Alkyl in the definition of R$_4$, R$_5$ and R$_6$ is, for example, $C_1$–$C_4$alkyl, such as methyl, ethyl, propyl, isopropyl, n-butyl, isobutyl, sec-butyl or tert-butyl.

R$_6$ is preferably ethyl and especially methyl.
Aryl in the definition of R$_4$, R$_5$ and R$_6$ is, for example, phenyl or naphthyl.

A heterocyclic ring formed by R$_1$, R$_2$ and the nitrogen atom in —NR$_1$R$_2$ is, for example, a heterocyclic ring of the phthalimidyl, lactam or saccharin series.

Heteroaryl in the definition of R$_5$ is, for example, thiazolyl, triazolyl or thiadiazolyl.

Heteroaryl in the definition of R$_6$ is, for example, thiophene or furan.

Y is preferably cyano.
n is preferably an integer from 2 to 4, especially 2 or 3.
m is preferably an integer from 1 to 3, especially 2.
Special preference is given to pyridone dyes of formulae

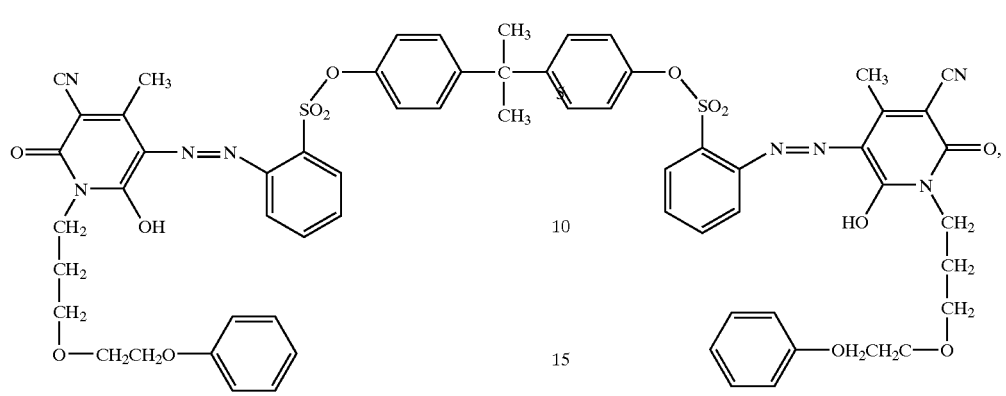
(100)
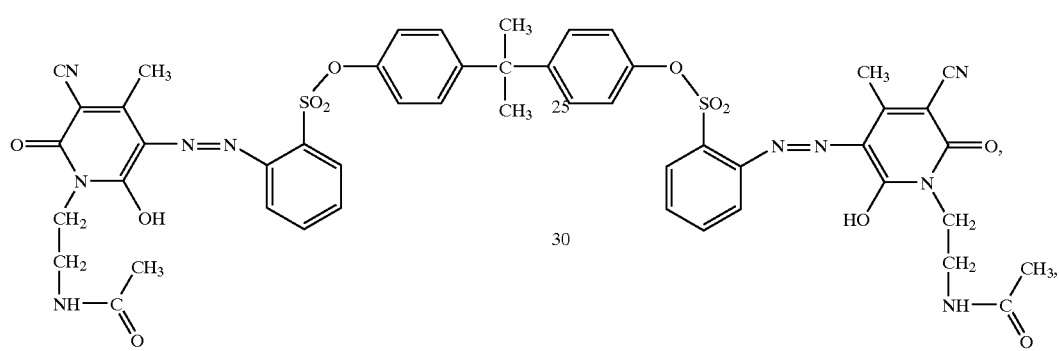
(101)
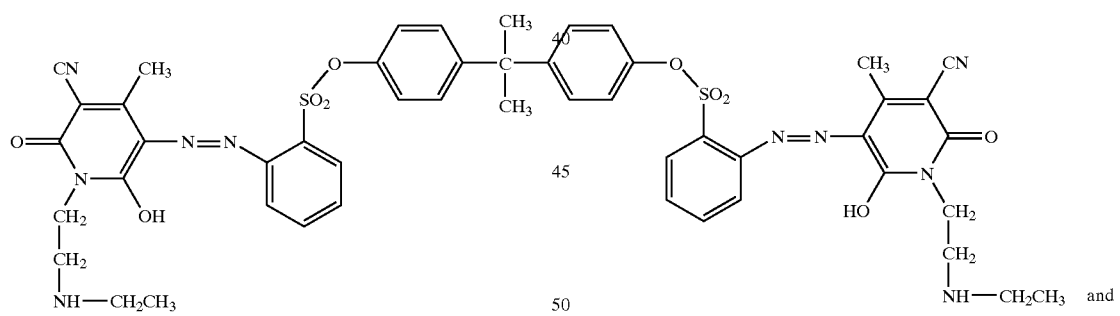
(102)
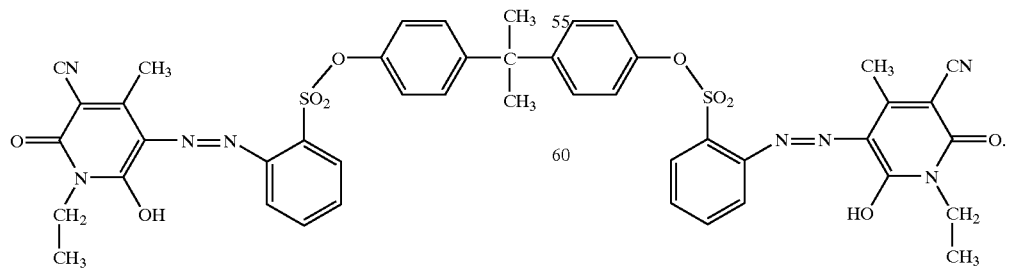
and
(103)

The present invention relates also to a process for the preparation of the pyridone dyes of formula (1) according to the invention.

Those dyes are prepared, for example, as follows: a compound of formula (50)

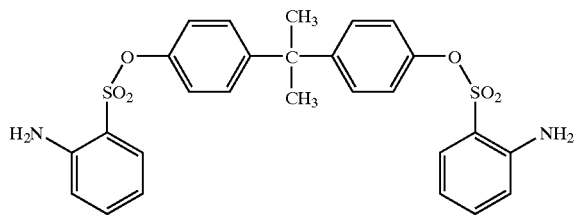

is diazotised in accordance with a conventional procedure and then coupled, in a molar ratio of 1:2, to a coupling component of formula (51)

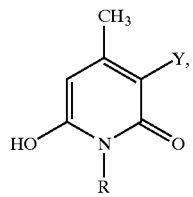

wherein R and Y are as defined above for formula (1).

The diazotisation of the compound of formula (50) is effected in a manner known per se, for example with sodium nitrite in an acidic, e.g. hydrochloric-acid-containing or sulfuric-acid-containing, aqueous medium. The diazotisation may, however, also be carried out using other diazotisation agents, e.g. using nitrosylsulfuric acid. In the diazotisation, an additional acid may be present in the reaction medium, e.g. phosphoric acid, sulfuric acid, acetic acid, propionic acid, hydrochloric acid or a mixture of such acids, e.g. a mixture of propionic acid and acetic acid. The diazotisation is advantageously carried out at temperatures of from −10 to 30° C., for example from −10° C. to room temperature.

The coupling of the diazotised compound of formula (50) to the coupling component of formula (51) is likewise effected in known manner, for example in an acidic, aqueous or aqueous-organic, medium, advantageously at temperatures of from −10 to 30° C., especially below 10° C. Examples of acids used are hydrochloric acid, acetic acid, propionic acid, sulfuric acid and phosphoric acid.

The compounds of formula (50) are known or can be prepared in a manner known per se.

The coupling components of formula (51) are known or can be prepared in a manner known per se, for example by reacting a compound of formula

NC—CH$_2$—CO—O—CH$_2$CH$_3$ (52)

first with a compound of formula

H$_2$N—(CH$_2$)$_2$—NH$_2$ (53)

and then with a compound of formula

H$_3$C—CO—CH$_2$—COO—CH$_2$CH$_3$ (54)

to yield a compound of formula (55)

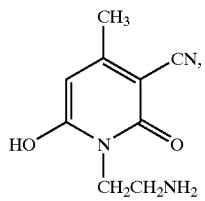

or, for example, by reacting a compound of formula (52) first with ethanolamine or, for example, an ethanolamine ether derivative and then with a compound of formula (54) to yield a compound of formula (56)

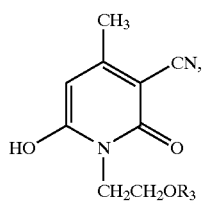

wherein R$_3$ is as defined above.

Starting from the compound of formula (55) the corresponding compounds of formula (51) can then be prepared in a manner known per se by further reacting the amino group, for example, with benzoyl chloride or acetyl chloride.

The compounds of formulae (52) to (54) are known and can be prepared in a manner known per se.

The present invention relates also to a method for the production of coloured plastics or polymeric colour particles, which comprises mixing together a high molecular weight organic material and a tinctorially effective amount of at least one pyridone dye of formula (1).

The colouring of high molecular weight organic substances with the pyridone dye of formula (1) is carried out, for example, by mixing such a pyridone dye into those substrates using roll mills, mixing apparatus or grinding apparatus, with the result that the pyridone dye is dissolved or finely dispersed in the high molecular weight material. The high molecular weight organic material with the admixed pyridone dye is then processed using processes known per se, for example calendering, compression moulding, extrusion, coating, spinning, casting or injection moulding, whereby the coloured material acquires its final form. It is also possible for the admixing of the pyridone dye to be carried out immediately prior to the actual processing step, for example by continuously feeding a pulverulent pyridone dye and, at the same time, a granulated or pulverulent high molecular weight organic material, and optionally also additional ingredients, e.g. additives, directly into the intake zone of an extruder, where mixing takes place just before processing. In general, however, it is preferable for the pyridone dye to be mixed into the high molecular weight organic material beforehand, because more even coloration of the substrates can be obtained.

In order to produce non-rigid mouldings or to reduce their brittleness, it is often desirable to incorporate so-called plasticisers into the high molecular weight compounds prior to shaping. There may be used as plasticisers, for example, esters of phosphoric acid, phthalic acid or sebacic acid. In the process according to the invention the plasticisers may be incorporated into the polymers before or after the incorporation of the colorant. It is also possible, in order to achieve different shades of colour, to add to the high molecular weight organic materials, in addition to the pyridone dye of formula (1), also further pyridone dyes or other colorants in any desired amounts, optionally together with further additives, e.g. fillers or siccatives.

In order to improve the light fastness properties, UV absorbers are advantageously mixed into the plastics or polymeric particles to be coloured with the pyridone dye of formula (1) according to the invention. The amount of UV absorber can vary within a wide range; advantageously there is used from 0.01 to 1.0% by weight, especially from 0.05 to 0.6% by weight, more especially from 0.1 to 0.4% by weight, of a UV absorber, based on the weight of the plastics or polymeric particles.

Suitable UV absorbers are especially 2-(2'-hydroxyphenyl)benzotriazoles, 2-hydroxybenzo-phenones, esters of substituted or unsubstituted benzoic acid, acrylates, oxamides, 2-(2-hydroxyphenyl)-1,3,5-triazines, monobenzoates of resorcinol or formamidines, and a polyester UV absorber of formula

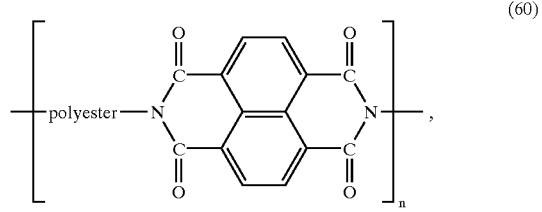

(60)

having a specific weight of from 1200 to 1400, preferably from 1300 to 1350, at 25° C.

From the class of the 2-(2'-hydroxyphenyl)benzotriazoles there may be mentioned, for example, 2-(2'-hydroxy-5'-methylphenyl)benzotriazole, 2-(3',5'-di-tert-butyl-2'-hydroxy-phenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)-benzotriazole, 2-(3',5'-di-tert-amyl-2'-hydroxyphenyl)benzotriazole, 2-(3',5'-bis(α,α-dimethyl-benzyl)-2'-hydroxyphenyl)benzotriazole, 2-(3'-tert-butyl-2'-hydroxy-5'-(2-octyloxycarbonyl-ethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonyl-ethyl)phenyl)-5-chlorobenzotriazole, 2-(3'-tert-butyl-2'-hydroxy-5'-(2-methoxycarbonylethyl)-phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-iso-octyloxycarbonylethyl)phenylbenzotriazole, 2,2'-methylene-bis[4-(1,1,3,3-tetramethylbutyl)-6-benzotriazol-2-ylphenol]; the transesterification product of 2-[3'-tert-butyl-5'-(2-methoxy-carbonylethyl)-2'-hydroxyphenyl]-2H-benzotriazole with polyethylene glycol 300;

[R—CH$_2$CH$_2$—COO—CH$_2$CH$_2$$]_2$, wherein R=3'-tert-butyl-4'-hydroxy-5'-2H-benzotriazol-2-ylphenyl; 2-[2'-hydroxy-3'-(α,α-dimethylbenzyl)-5'-(1,1,3,3-tetramethylbutyl)phenyl]-benzotriazole; and 2-[2'-hydroxy-3'-(1,1,3,3-tetramethylbutyl)-5'-(α,α-dimethylbenzyl)phenyl]-benzotriazole.

From the class of the 2-hydroxybenzophenones there may be mentioned, for example, the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

From the class of the 2-(2-hydroxyphenyl)-1,3,5-triazines there may be mentioned, for example, 2,4,6-tris(2-hydroxy-4-octyloxyphenyl)-1,3,5triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/-tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine and 2-(2-hydroxyphenyl)-4-(4-methoxyphenyl)-6-phenyl-1,3,5-triazine.

From the class of the oxamides there may be mentioned, for example, 4,4'-dioctyloxy-oxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethyloxanilide and a mixture thereof with 2-ethoxy-2'-ethyl-5,4'-di-tert-butoxanilide and mixtures of o- and p-methoxy-disubstituted oxanilides and mixtures of o- and p-ethoxy-disubstituted oxanilides.

As esters of substituted or unsubstituted benzoic acid there may be mentioned, for example, 4-tert-butylphenyl salicylate, phenyl salicylates, octylphenyl salicylates, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate or 2-methyl-4,6-di-tert-butylphenyl 3,5-di-tert-butyl-4-hydroxy-benzoate.

From the class of the acrylates there may be mentioned, for example, ethyl α-cyano-β,β-diphenylacrylate, isooctyl α-cyano-β,β-diphenylacrylate, methyl α-methoxycarbonyl-cinnamate, methyl α-cyano-β-methyl-p-methoxycinnamate, butyl α-cyano-β-methyl-p-methoxycinnamate, methyl α-methoxycarbonyl-p-methoxycinnamate or N-(β-methoxy-carbonyl-β-cyanovinyl)-2-methylindoline.

A resorcinol monobenzoate is, for example, a compound of formula (61)

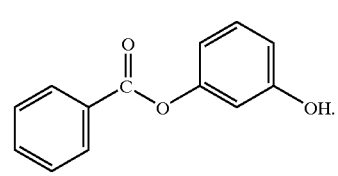

A formamidine is, for example, a compound of formula

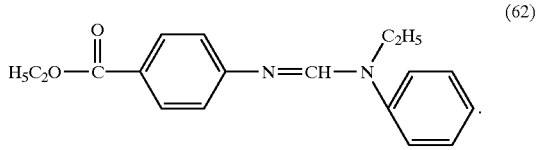
(62)

Preference is given to the colouring of thermoplastic plastics, especially in the form of fibres, granules or mouldings, for example containers for solid or liquid substances, for example bottles. Preferred high molecular weight organic materials to be coloured according to the invention are very generally polymers having a dielectric constant of ≧2.5, especially polyester, polycarbonate (PC), polystyrene (PS), polymethyl methacrylate (PMMA), polyamide, polyethylene, polypropylene, styrene/acrylonitrile (SAN) or acrylonitrile/butadiene/styrene (ABS). Polyester and polyamide are especially preferred. Very special preference is given to linear aromatic polyesters obtainable by polycondensation of terephthalic acid or naphthalene-2,6-dicarboxylic acid and glycols, especially ethylene glycol, or condensation products of terephthalic acid and 1,4-bis(hydroxymethyl)cyclohexane, for example polyethylene terephthalate (PET), polyethylene naphthalene-2,6-dicarboxylate (PEN) or polybutylene terephthalate (PBTP); also polycarbonates, e.g. those from α,α-dimethyl-4,4-dihydroxy-diphenylmethane and phosgene, or polymers based on polyvinyl chloride and on polyamides, e.g. polyamide-6 or polyamide-6,6.

The pyridone dyes according to the invention impart to the mentioned materials, especially to polyester material, tinctorially strong, level colour shades having very good in-use fastness properties, especially good light fastness and high-temperature light fastness. Special mention may be made of the good migration fastness and thermomigration fastness of the dyeings obtained.

The invention relates also to a method for the production of coloured plastics or polymeric colour particles, which comprises using a combination of a pyridone dye of formula (1) and a UV absorber, wherein the meanings and preferred meanings given above for the pyridone dyes of formula (1) and the UV absorbers apply.

The invention relates also to plastics that have been mass-coloured by the methods mentioned above.

The following Examples serve to illustrate the invention. Unless otherwise indicated, the parts are parts by weight and the percentages are percentages by weight. The temperatures are given in degrees Celsius. The relationship between parts by weight and parts by volume is the same as that between grams and cubic centimetres.

EXAMPLE 1

113.0 g of ethyl cyanoacetate are introduced into a reaction vessel and 67.8 g of ethanolamine are added dropwise thereto at room temperature.

The reaction temperature is then raised to 60° C. and the reaction mixture is maintained at that temperature, with stirring, for 14 hours. There are then added 143.8 g of ethyl acetoacetate and
62.4 g of ammonia and the temperature is maintained in the range of 70–80° C. for 50 hours. The reaction mixture is then concentrated by evaporation and the resulting brown oil is introduced slowly, with stirring, into a reaction flask containing 250.0 g of ice and
100 ml of conc. HCl.

The resulting crystalline suspension is filtered, and the residue is washed with ice-water and dried at 50° C.

92.6 g of the compound of formula

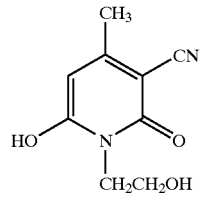
(56)

are obtained.

EXAMPLE 2

(A) In a reaction vessel, 22.0 g of the compound of formula

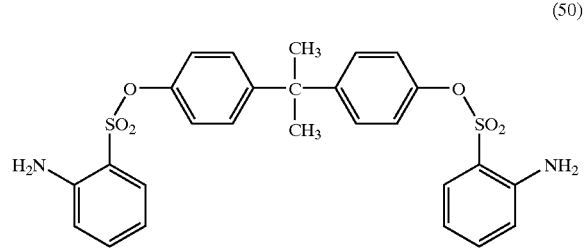
(50)

are suspended in 160.0 g of 98% acetic acid, and 16.0 g of 32% HCl are added. 20.0 ml of 4N NaNO₂ are then added dropwise, at from 5 to 10° C., to the resulting solution, and the mixture is stirred at 10–15° C. for 1 hour. The excess nitrite is then destroyed using sulfamic acid.

(B) In a reaction vessel, 6.6 g of the compound of formula

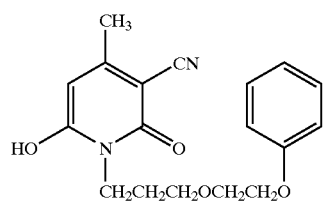
(59)

are introduced into 100.0 ml of water, and 3.0 g of 30% aqueous NaOH are added. The reaction mixture is adjusted to a pH of 4–5 and cooled to a temperature of 5–10° C. The diazo solution prepared according to (A) is then added dropwise, the temperature being maintained below 10° C. by the addition of about 200.0 g of ice. When the addition is complete, the reaction mixture is stirred at room temperature for a further 3 hours. 100.0 ml of water are then added, and the reaction mixture is heated to 70° C., filtered with suction, washed with water and dried.

37.0 g of a pyridone dye of formula
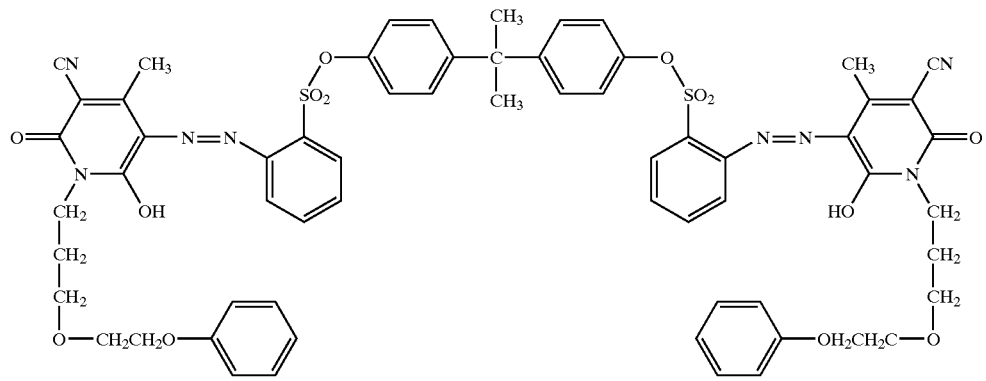
(104)
are obtained, which dyes polyester in yellow shades.
EXAMPLES 3–16
Analogously to the process described In Example 1, it is also possible to prepare the following pyridone dyes listed in Table 1, which likewise dye polyester in yellow shades:
TABLE 1
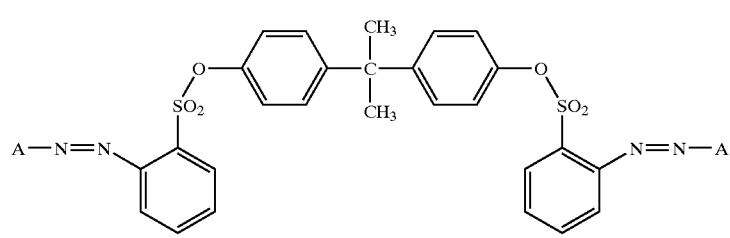
| A | A |
|---|---|
| 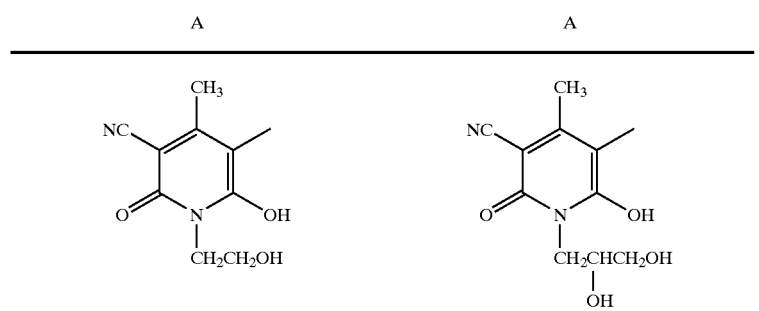 | |
| 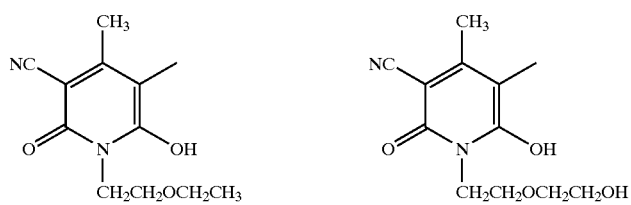 | |

TABLE 1-continued
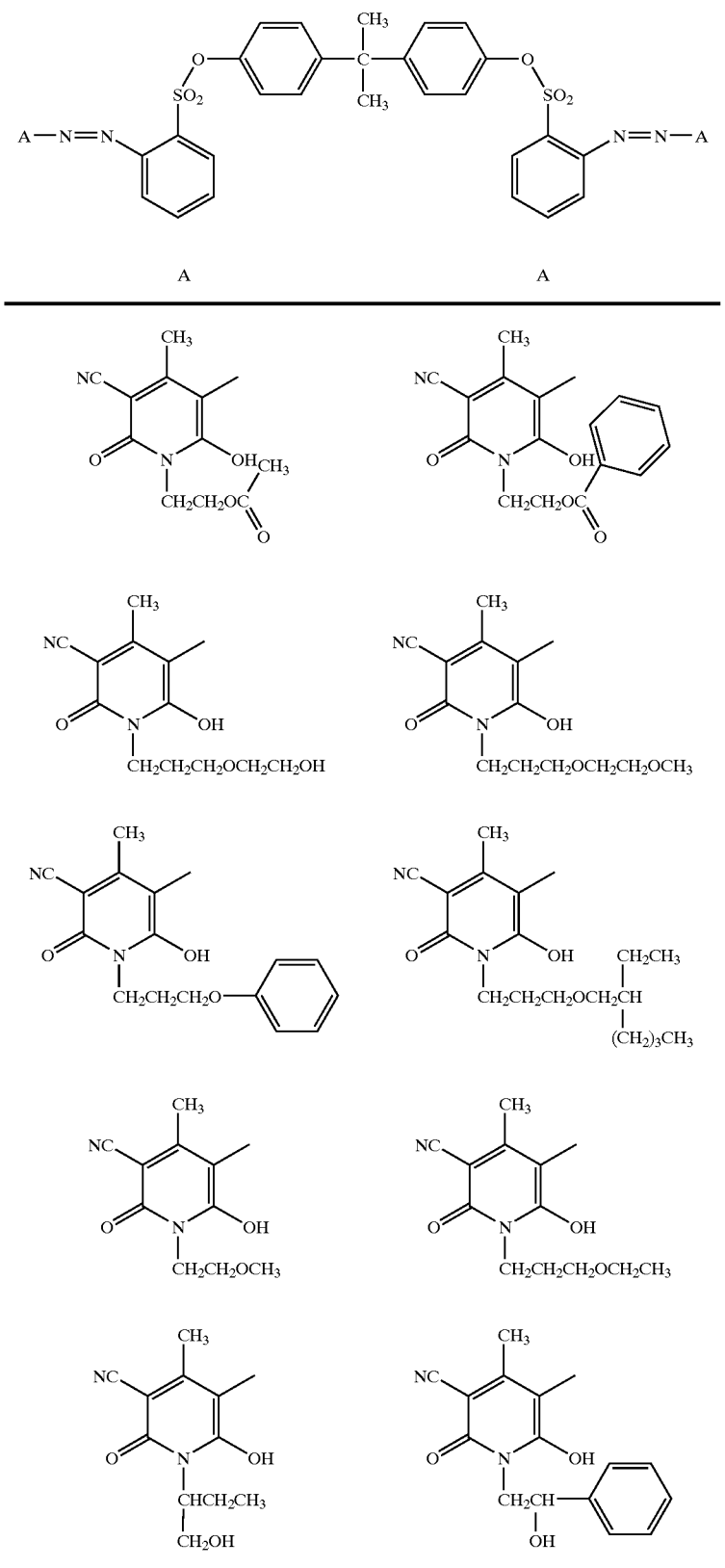

EXAMPLE 17

(A) 140.0 ml of water are introduced into a reaction vessel and cooled to 0–5° C. Then, in the course of 30 minutes, 405.2 ml of ethylenediamine and then 215.4 ml of ethyl cyanoacetate are added dropwise, the temperature being maintained below 20° C. by cooling. The reaction mixture is then stirred at 20° C. for 16 hours, the excess ethylenediamine is distilled off in vacuo at 60° C. and the mixture is stirred at 40° C. for 1 hour.

253.0 ml of ethyl acetoacetate are then added dropwise, the temperature being raised to 70° C. towards the end of the dropwise addition. Immediately after the addition of the ethyl acetoacetate is complete, 168.0 ml of a 30% aqueous ammonium hydroxide solution and then 1400.0 ml of propanol are added, and the reaction mixture is stirred at 70–75° C. for 16 hours. The resulting suspension is filtered, the residue is introduced into 1500.0 ml of ethanol, and the mixture is stirred at 20° C. for 14 hours and filtered again. The filter cake is washed with a total of 1000.0 ml of ethanol in portions and dried.

263.6 g of a compound of formula

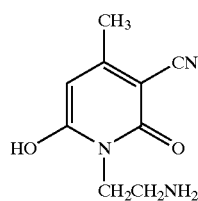

(55)

are obtained.

(B) 50.0 g of the compound of formula (55) are suspended in 500.0 ml of water, heated to 60° C., adjusted to pH 1.0 with 32% HCl and stirred at 60° C. for three hours. A crystalline precipitate is then removed from the reaction mixture by filtration, the mother liquor is adjusted to pH 9.0 with 30% aqueous NaOH, and 40.0 ml of benzoyl chloride are added. The reaction mixture is then stirred for 18 hours, the pH being maintained at 9.0, if necessary by the addition of HCl.

100.0 g of NaCl are then added, and the fully reacted reaction mixture is adjusted to pH 0.5 with 32% HCl and stirred at 0° C. until the product has precipitated. The precipitated reaction product is filtered off with suction and dried.

93.5 g of a product containing 62.3 g of a compound of formula

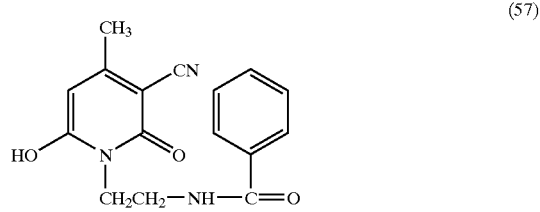

(57)

are obtained.

(C) 22.0 g of the compound of formula

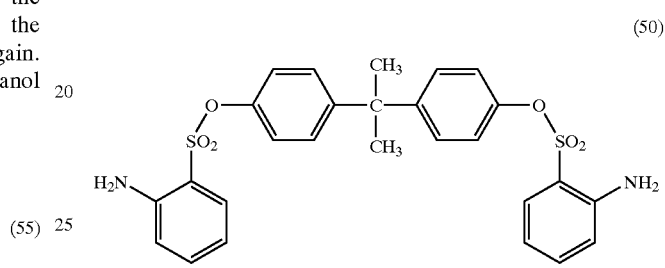

(50)

are suspended in 160.0 g of 98% acetic acid, and 16.0 g of 32% HCl are added. 20.0 ml of 4N NaNO$_2$ are then added dropwise, at from 5 to 10° C., to the resulting solution, and the mixture is stirred at 10–15° C. for 1 hour. The excess nitrite is then destroyed using sulfamic acid.

(D) 9.5 g of the compound of formula (57) prepared according to (B) are introduced into 150.0 ml of water, 22.0 g of 30% aqueous NaOH are added, and the mixture is heated to 50° C. The diazo solution prepared according to (C) is then added dropwise to the resulting suspension, the temperature being maintained at 15° C. by the addition of about 200.0 g of ice. When the addition is complete, the pH is adjusted to 5.0 and the reaction mixture is stirred for 16 hours.

300.0 ml of water are then added, and the fully reacted reaction mixture is heated to 70° C., filtered with suction, washed with water and dried.

35.5 g of a pyridone dye of formula

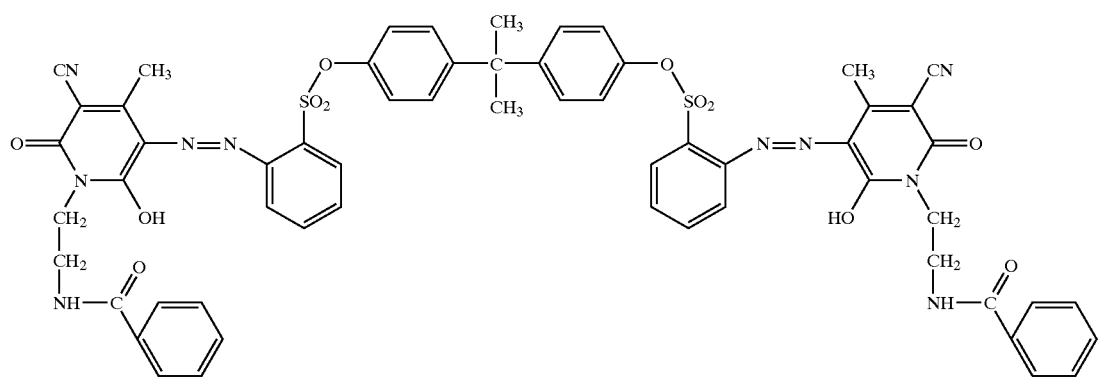

(101)

are obtained, which dyes polyester in yellow shades.
EXAMPLES 18–28
Analogously to the process described in Example 17, it is also possible to prepare the following pyridone dyes listed in Table 2, which likewise dye polyester in yellow shades:
TABLE 2
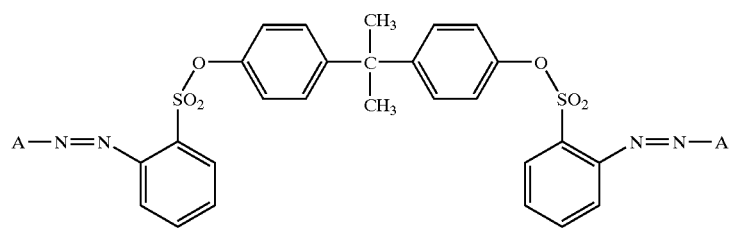
| A | A |
|---|---|
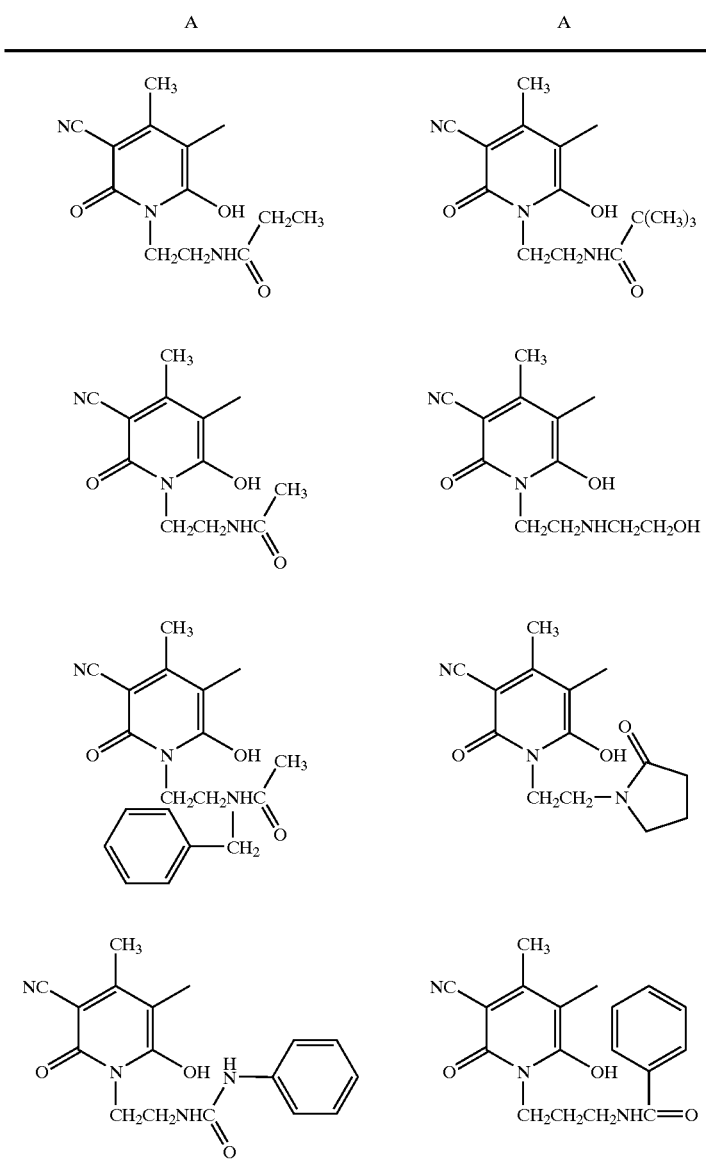

TABLE 2-continued

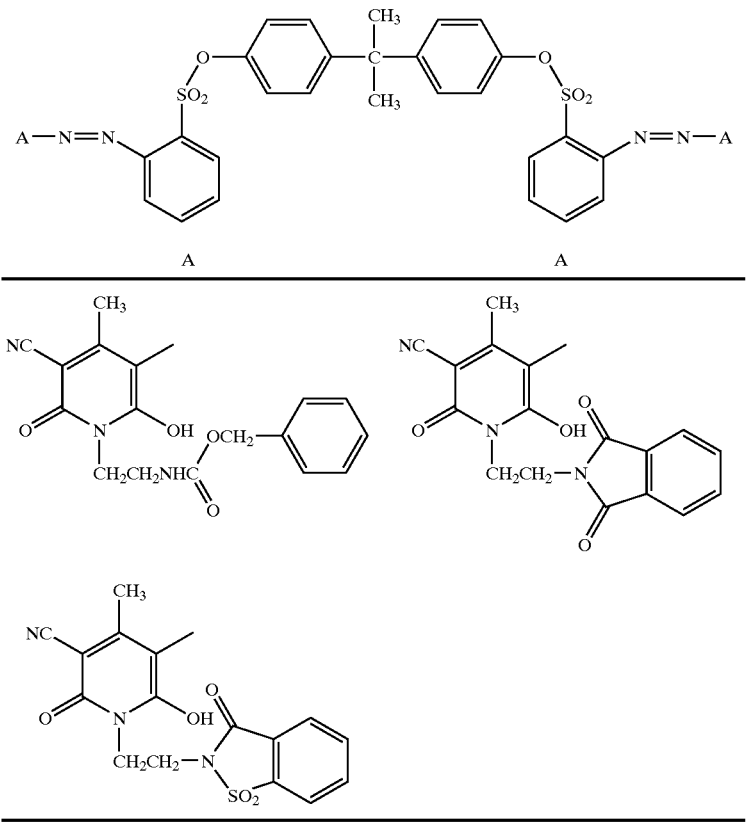

Dyeing Example 1

1200.00 g of polyester granules (PET Arnite D04-300, DSM) are pre-dried for 4 hours at 130° C. and then mixed homogeneously with 0.25 g of the pyridone dye of formula (100)
in a "roller rack" mixing apparatus for 15 minutes at 60 revolutions per minute.

The homogeneous mixture is extruded in an extruder (twin screw 25 mm, from Collin, D-85560 Ebersberg) with 6 heating zones at a maximum temperature of 275° C., cooled with water, granulated in a granulator (Turb Etuve TE 25, from MAPAG AG, CH-3001 Bern) and then dried at 130° C. for 4 hours.

The resulting yellow-coloured polyester granules have good allround fastness properties, especially very good light fastness and high-temperature light fastness properties.

Dyeing Example 2

1200.00 g of polyester granules (PET Arnite D04-300, DSM) are pre-dried for 4 hours at 130° C. and then mixed homogeneously with 0.56 g of the pyridone dye of formula (100) and 3.60 g of a UV absorber of formula

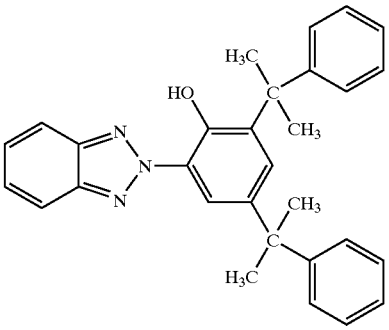

(63)

in a "roller rack" mixing apparatus for 15 minutes at 60 revolutions per minute.

The homogeneous mixture is extruded in an extruder (twin screw 25 mm, from Collin, D-85560 Ebersberg) with 6 heating zones at a maximum temperature of 275° C., cooled with water, granulated in a granulator (Turb Etuve TE 25 from MAPAG AG, CH-3001 Bern) and then dried at 130° C. for 4 hours.

The resulting yellow-coloured polyester granules have good allround fastness properties, especially very good light fastness and high-temperature light fastness properties.

What is claimed is:

1. A pyridone dye of formula

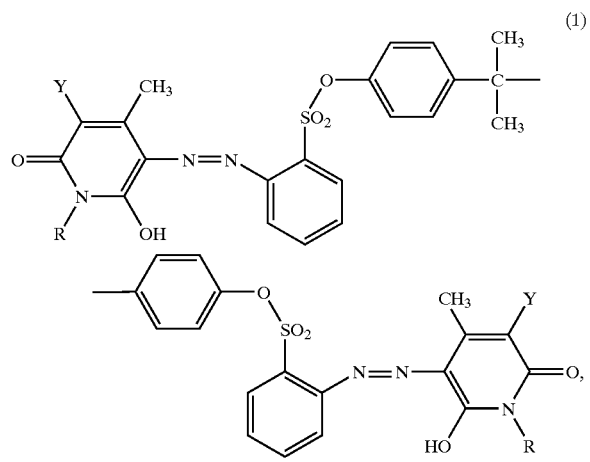
(1)

wherein
R is a radical —(CR'H)$_n$—W,
R' is hydrogen, C–C$_2$alkyl or phenyl,
Y is cyano, —CONH$_2$ or —CH$_2$SO$_3$H,
W is hydrogen, a radical —NR$_1$R$_2$ or a radical —OR$_3$,
R$_1$ and R$_2$ are each independently of the other hydrogen, unsubstituted or hydroxy- or phenyl-substituted C$_1$–C$_6$alkyl, it being possible for the alkyl chain from C$_3$ upwards to be interrupted by one or more oxygen atoms, or a radical of formula

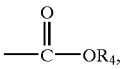
(3)

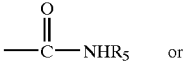
(4)

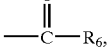
or

(5)

or R$_1$ and R$_2$ together with the nitrogen atom in —NR$_1$R$_2$ form a heterocyclic ring, R$_3$ is hydrogen, unsubstituted or hydroxy-substituted C$_1$–C$_6$alkyl, phenyl or a radical of formula —(CH$_2$)$_m$O—⟨phenyl⟩,  (6)

R$_4$ is alkyl or aryl,
R$_5$ and R$_6$ are each independently of the other alkyl, aryl or heteroaryl,
n is an integer from 2 to 6, and
m is an integer from 1 to 6.

2. A pyridone dye according to claim 1 of formula

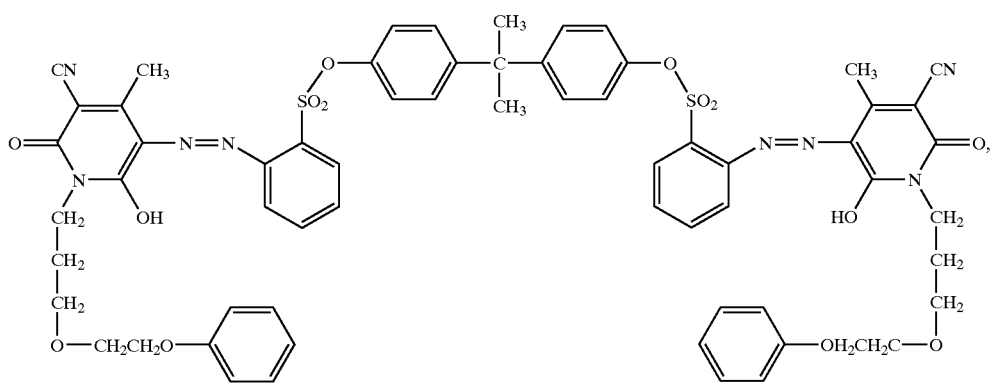
(100)

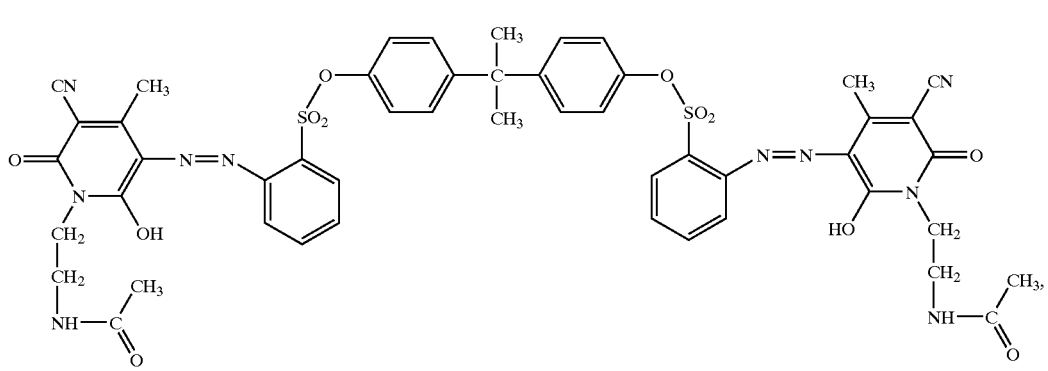
(101)

-continued

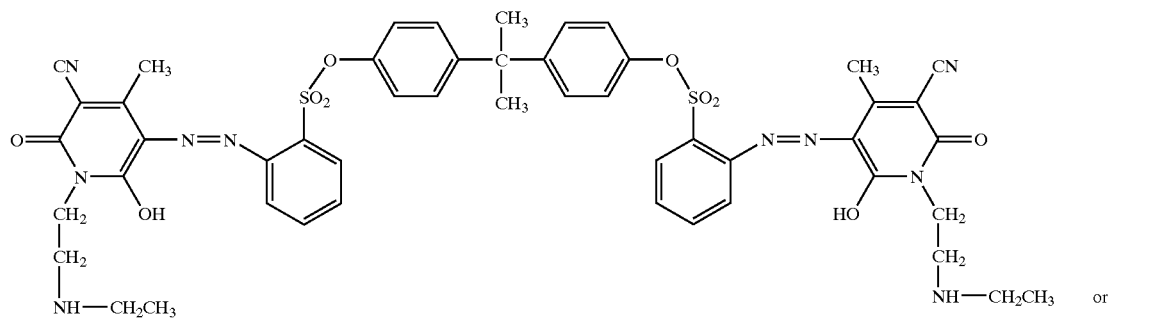
(102)

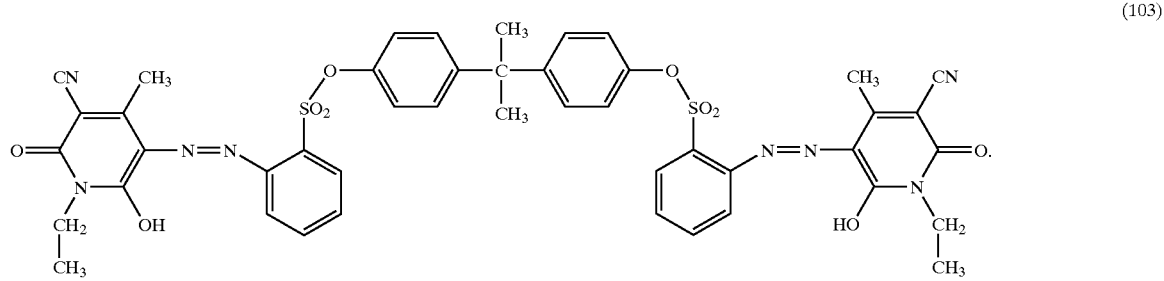
or
(103)

3. A process for the preparation of a pyridone dye of formula (1) according to claim 1, wherein a compound of formula

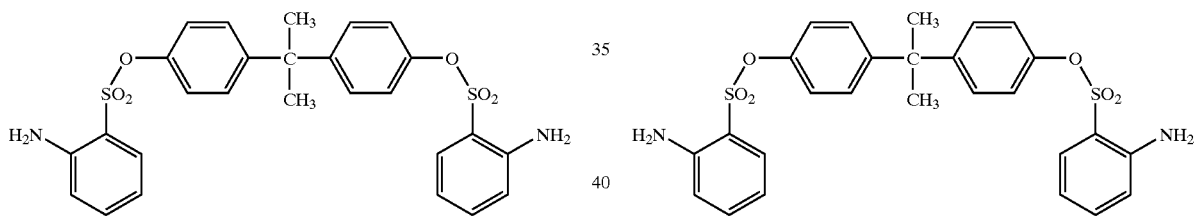
(50)

is diazotised in accordance with a conventional procedure and then coupled, in a molar ratio of 1:2, to a coupling component of formula

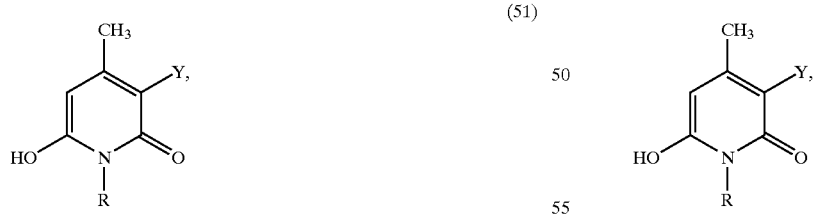
(51)

wherein R and Y are as defined above for formula (1) according to claim 1.

4. A pyridone dye of formula (1) according to claim 1, wherein Y is cyano or —$CONH_2$.

5. A process for the preparation of a pyridone dye of formula (1) according to claim 1 in which Y is cyano or —$CONH_2$, wherein a compound of formula (50)

is diazotized in accordance with a conventional procedure and then coupled, in a molar ratio of 1:2, to a coupling component of formula (51)

wherein R is as defined in claim 1 and Y is cyano or —$CONH_2$.

* * * * *